(12) United States Patent
Wang et al.

(10) Patent No.: US 9,492,968 B2
(45) Date of Patent: Nov. 15, 2016

(54) THREE-DIMENSIONAL POWDER MOLDING

(75) Inventors: Hsin-Pang Wang, Rexford, NY (US); Erin Marie Perry, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 519 days.

(21) Appl. No.: 13/015,897

(22) Filed: Jan. 28, 2011

(65) Prior Publication Data

US 2012/0193841 A1    Aug. 2, 2012

(51) Int. Cl.

| | | |
|---|---|---|
| B22F 3/10 | (2006.01) | |
| B22F 3/22 | (2006.01) | |
| B22F 5/00 | (2006.01) | |
| B29C 45/34 | (2006.01) | |
| B29C 67/00 | (2006.01) | |
| B22F 3/105 | (2006.01) | |

(52) U.S. Cl.
CPC ......... *B29C 67/0051* (2013.01); *B22F 3/1055* (2013.01); *B22F 3/225* (2013.01); *B22F 5/007* (2013.01); *Y02P 10/292* (2015.11); *Y02P 10/295* (2015.11)

(58) Field of Classification Search
None
See application file for complete search history.

(56) References Cited

U.S. PATENT DOCUMENTS

| | | | |
|---|---|---|---|
| 5,145,908 A * | 9/1992 | Jenny et al. ................. 524/827 |
| 5,189,781 A | 3/1993 | Weiss et al. | |
| 5,387,380 A | 2/1995 | Cima et al. | |
| 5,524,696 A * | 6/1996 | Osborne ................. B22C 9/046 164/120 |
| 5,641,448 A | 6/1997 | Yeung et al. | |
| 5,658,506 A | 8/1997 | White et al. | |
| 5,824,250 A * | 10/1998 | Whalen ................. C04B 35/622 264/219 |
| 6,008,281 A * | 12/1999 | Yang ..................... B22F 1/0059 264/109 |
| 6,224,816 B1 * | 5/2001 | Hull ....................... B22F 5/007 264/219 |
| 6,375,880 B1 * | 4/2002 | Cooper .................. B29C 33/52 264/138 |

(Continued)

FOREIGN PATENT DOCUMENTS

CN    1513811 A  *  7/2004

OTHER PUBLICATIONS

Guo et al., "Rapid Prototyping of Piezoelectric Ceramics via Selective Laser Sintering and Gelcasting", J. Am. Ceram. Soc. 87 (1) 17-22, 2004.*

(Continued)

*Primary Examiner* — Lisa Herring
(74) *Attorney, Agent, or Firm* — John P. Darling

(57) ABSTRACT

A system and a method of fabricating a complex three dimensional part are described. The system comprises a rapid prototyping machine configured to provide a disposable mold having a negative imprint of a complex three dimensional structure, a mixer, an injection molding machine, and a furnace system. A slurry comprising a powder and a binder is introduced into the disposable mold, the binder is cured, the disposable mold is removed, and the binder is removed, leaving an intact cured structure. The cured structure is sintered to fabricate the complex three dimensional part.

16 Claims, 11 Drawing Sheets

(56) References Cited

U.S. PATENT DOCUMENTS

| | | | |
|---|---|---|---|
| 6,517,773 B1* | 2/2003 | Mitchell | B22F 1/0059 419/37 |
| 7,125,512 B2 | 10/2006 | Crump et al. | |
| 7,413,001 B2 | 8/2008 | Wang et al. | |
| 7,487,819 B2 | 2/2009 | Wang et al. | |
| 7,624,787 B2 | 12/2009 | Lee et al. | |
| 2002/0104973 A1* | 8/2002 | Kerekes | B29C 67/0059 250/559.2 |
| 2004/0016239 A1* | 1/2004 | Fabian et al. | 60/805 |
| 2008/0027163 A1* | 1/2008 | McNulty et al. | 524/404 |
| 2008/0135721 A1 | 6/2008 | Wang et al. | |
| 2008/0190582 A1 | 8/2008 | Lee et al. | |
| 2008/0226486 A1* | 9/2008 | Lherbier et al. | 419/2 |
| 2010/0025001 A1 | 2/2010 | Lee et al. | |
| 2010/0034647 A1 | 2/2010 | Lee et al. | |

OTHER PUBLICATIONS

CN1513811A Machine Translation performed Apr. 15, 2013.*
Cai et al., "Solid freeform fabrication of alumina ceramic parts through a lost mould method", J. Euro. Ceram. Soc., 23, pp. 921-925, 2003.*
Zorzi et al., "A new partially isostatic method for fast debinding of low-pressure injection molded ceramic parts", Materials Letters 57 (2003), pp. 3784-3788.*
Shibu, "Introduction to Embedded Systems", McGraw Hill, 2009, pp. 616-617.*
Krause, ORNL's Gelcasting: Molding the Future of Ceramic Forming, available online Jan. 31, 2001.*
Morales et al., "Fabrication of Ceramic Microstructures via Microcasting of Nanoparticulate Slurry", J. Am. Ceram. Soc. 88[3] 570-578, 2005.*
Sakamoto, "Gel Casting of Metal Powder for Mold SDM", Stanford University, 1999.*
Raja et al., Reverse Engineering, "Introduction to Rapid Prototyping", pp. 102-105.*
Raja et al., Reverse Engineering, "Introduction to Rapid Prototyping", pp. 102-105, copyright 2008.*
Adams, "Jet Engine Cooling Used in Groundbreaking New LED Lamp Design from GE," Oct. 2010, 6 pages, Reef Builders: The Reef and Marine Aquarium Blog, retrieved from: http://reefbuilders.com/2010/10/26/jet-engine-cooling-groundbreaking-led-lamp-design-ge.
XCENTRIC Mold & Engineering, Custom Injection Molding, retrieved on Jan. 26, 2011 from http://www.xcentricmold.com/faqs.html. 2 pages.
Beall, "By Design, Part Design 107: Draft Angles," Jan. 2000, 3 pages, retrieved from: http://plasticstoday.com/imm/articles/design-part-design-107-draft-angles, Injection Molding Column.
Phenix Systems, "Phenix Systems Presentation," retrieved form: http://www.phenix-systems.com/phenix_en/home.htm on Jan. 28, 2011, 1 page.
CSA Discovery Guides, ProQuest, Rapid Manufacturing Articles, Sep. 2002, retrieved from: http//www.csa.com/discoveryguides/rapidman/abstracts-f.php, 19 pages.
Power Injection Moulding, "Metal Injection Moulding (MIM) and Ceramic Injection Molding (CIM)—PIM International," retrieved Jan. 26, 2011 from: http://www.pim-international.com, 6 pages.
Manufacturing Cost Estimation, retrieved on Jan. 26, 2011 from http://www.custompartnet.com, 2 pages.
3D Systems, "Rapid Prototyping, Advance Digital Manufacturing, 3D Printing, 3-D CAD," retrieved on Jan. 26, 2011 from http://3dsystems.com, 1 page.
GDF Hannover bR, "2 Data Dimensions in GIS," Aug. 2005, retrieved on Jan. 26, 2011 from: http://www.gdf-hannover.de/lit_html/grass60_v1.2_en/node9.html, 1 page.

* cited by examiner

THREE-DIMENSIONAL POWDER MOLDING

TECHNICAL FIELD

Embodiments of the present invention relate to manufacturing processes and systems, more specifically, a system and method to fabricate complex three dimensional parts.

BACKGROUND

The conventional injection molding process for making complex plastic parts or components has been around for over six decades. The modern investment casting process, also known as precision casting, which leverages injection molding technology for making wax patterns and ceramic cores for making complex metal parts, such as for the aerospace and defense industries, has been around for almost as long. Powder injection molding (PIM) is a process in which a metal or ceramic powder/binder mixture is injection molded, and after binder removal and sintering, a net shape part is produced. The PIM technology again leverages existing molding technology. However, all of these processes are still limited in providing capabilities to produce complex three dimensional (3D) parts.

Conventional injection molding, investment casting, and PIM are limited to 2½D geometries due to tooling constraints, such as parting line and draft angle. The parting line defines the opening of the two-piece mold, where the linear motion of the mold halves during opening restricts the dimensionality of the molded part. The part can be three dimensional, but no portion of the part can be in front of any other section of the part in the mold opening direction, where it interferes with the mold opening process. Draft angles are tapers on the part surfaces that allow the part to slide past the mold walls as the part is being ejected. A complex three dimensional (3D) part as described in this disclosure relates to three dimensional parts not limited by such tooling constraints.

The tooling constraints not only limit manufacturability, but further limit the design process, becoming design constraints. Design engineers need to constantly consider tooling constraints, such as the parting line and draft angle requirements, during the design process. Such consideration hinders the creativity of the designer, which can affect the design and performance of the final product. Design constraints are illustrated in the design of internal cooling technology for heat transfer and external aerodynamic surfaces for minimizing flow resistance in the aerospace, airframe and aircraft engine industries. Removal of the design restrictions on three dimensional internal cooling pathways and external three dimensional shapes would enable better product performance and faster design process.

The time for tooling design and fabrication is also significant, as it may span several months for complex parts. The cost of hard tooling also becomes very high for components with complex geometries. Multiple iterations of tool modifications are frequently needed to adjust the tools for the necessary tolerances, making these processes impractical, especially for low volume or one-of-a-kind applications.

Although injection molding mechanisms such as sideactions or cam-actuated slides exist to fabricate 3D geometries, these techniques are generally restricted to a few specific 3D geometries. The tooling development for such techniques is also very expensive, and requires a long turnaround time. As a result, these approaches are extremely costly and are generally not applicable for limited quantity part production.

Rapid Prototyping (RP) techniques bypass the 2½D tooling constraint. Rapid Prototyping refers to a group of technologies developed with the goal of shortening the design and development cycles. With these techniques, complex 3D parts can be made in much less time, often only a matter of days, without the need for tooling, setup and assembly. However, such 3D parts may have limitations with respect to the material performance and the manufacturing speed for parts composed of high temperature materials such as metals or ceramics. As an illustration, metallic or ceramic 3D parts produced by conventional layer manufacturing techniques may be subject to delamination due to weak bonding between the layers. As a result, parts produced by layer manufacturing are generally used as prototypes, not as production parts, as they are generally not suitable to withstand the loading conditions typical in real-world applications. In an alternative illustration, metallic or ceramic 3D parts produced by high-power point-source layer manufacturing techniques are characterized by slow production speed.

SUMMARY

Disclosed herein is a system and method of molding complex 3D parts, using a fabricated disposable mold and conventional powder injection molding, wherein a slurry consisting of metallic or ceramic powder and resin binder is injected into the above-mentioned disposable mold; the disposable mold/slurry are heated in an oven to cure the binder; the disposable mold is removed by thermal, chemical and/or mechanical means; the binder is removed during a debinding process; and the final metallic or ceramic part is sintered.

In some embodiments, the invention provides a system and method to fabricate a disposable mold using a rapid prototyping system. Disclosed also is a part/mold design system and method to provide mold designs to the rapid prototyping system.

The system and method allow the design and fabrication of cost effective complex 3D part components. The system and method further eliminate the assembly of multiple 2½D subcomponents, as single piece, near-net-shape hardware items which incorporate many detailed features into a single unitized subassembly are generally substantially less expensive than current multi-part, built-up assemblies. When properly designed, unitized structures also help to reduce structural weight as well as to provide design freedom for manufacturing stronger or more efficient components in engineering systems. One desirable characteristic of part components manufactured according to various embodiments of the invention, as opposed to known rapid manufacturing methods, is the absence of distinct layers, which necessarily render a part subject to delamination.

The system and method would allow for virtually any 3D geometry, including those with intricate internal features and those requiring structural integrity. Most of today's products do not undergo rigorous optimization because of the high tooling costs and long lead times. By reducing the cost and time restraints, the system and method would allow for the rapid validation of design concepts and a quick turnaround time for design iteration and optimization for performance improvement, without the acquisition of expensive hard tooling. In addition, low volume and one-of-a-kind applications would no longer be prohibitively expensive.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION

Embodiments of the invention are discussed below with reference to FIG. 1-10. Those skilled in the art will readily appreciate that the detailed description given herein with respect to these figures is for explanatory purposes, however, because the invention extends beyond the limits of these described embodiments.

Figure 1:
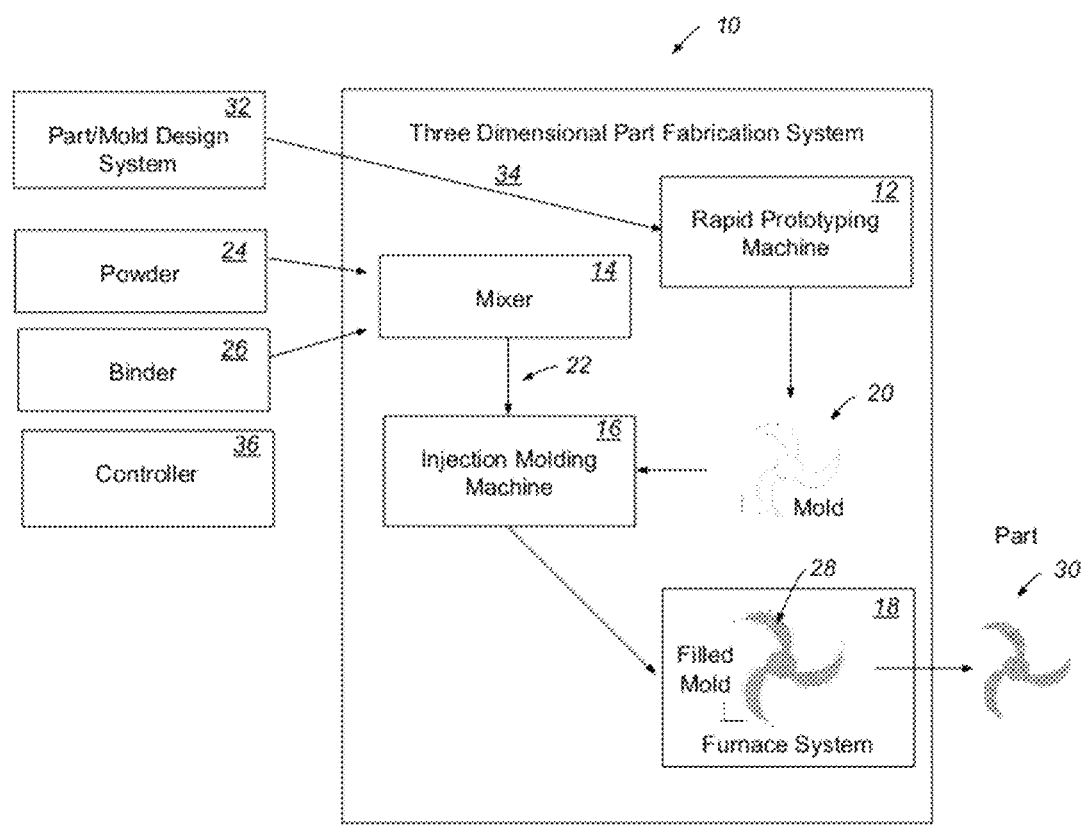
FIG. 1 is a diagram of a three dimensional part fabrication system in accordance to an illustrative embodiment.

FIG. 1 is a diagram of a three dimensional part fabrication system in accordance to an illustrative embodiment. The three dimensional part fabrication system 10 of FIG. 1 comprises a rapid prototyping (RP) machine 12, a mixer 14, an injection molding machine 16, and a furnace system 18.

The rapid prototyping machine 12 is configured to fabricate a disposable mold 20. In the illustrative embodiment, the rapid prototyping machine 12 is an inkjet printing machine, which utilizes photo-sensitive polymer droplets and prints along a line that has hundreds of droplet openings. Each of the droplet openings can be opened or closed simultaneously, depending on the geometry of the layer being printed. As the printing line traverses over the stage, the polymer droplets form a single layer of the disposable mold. The photo-sensitive polymer droplets can be comprised of an acrylic material that is cured by being exposed to ultraviolet light after each layer is deposited. As an illustration, a photo-sensitive polymer droplet is comprised of polyester resin mixed with a catalyzer, such as Benzil, Benzoilisobutylether (BIsoBE), Methyl diethanolamine (MDEA), and Ethylenediaminetetraacetic acid (EDTA). In alternative embodiments, other resins may be utilized, such as epoxy resins, and acrylic/alkydic resins. In this process, the disposable mold is built up, layer by layer. Since each layer is made from the impingement of polymer droplets on the previous layer, the layers exhibit good bonding with one another. Line printing enables high speed relative to the single point printing method. The number of droplet openings per linear inch, and the size of each droplet opening, enables high resolution. The final structure, after all the layers have been printed, is the disposable mold 20.

In an alternative embodiment, the rapid prototyping machine 12 may be a 2D page printing machine using a digital light processing (DLP) projection process. The 2D page printing machine lays down a thin layer of photosensitive liquid polymer over a two dimensional space, and an ultraviolet light cures the 2D cross-section of the part at that layer, similar to a lithographic process.

In another alternative embodiment, the rapid prototyping machine 12 can use techniques such as selective laser sintering, fused deposition and stereolithography (SLA). In these embodiments, polymeric or even low melting-point metals can be used for building the disposable mold. However, when using a metal disposable mold, the disposable mold melting point must be higher than the binder curing temperature and lower than the debinding temperature of the cured powder/binder structure.

The RP system and the corresponding RP materials are selected to build the disposable mold 20 with a resolution sufficiently high to ensure that all of the features in the 3D part design can be replicated in the disposable mold 20. Additionally, the RP material comprising the disposable mold 20 is selected to be compatible with the cured powder/binder structure. A significant mismatch in the thermal expansion coefficients of the disposable mold 20 and the cured powder/binder structure may generate stress resulting in cracks in the cured structure.

The resolution of the final part's surface finish is a function of the rapid prototyping machine 12 that is selected. High resolution surface finishes may be achieved with inkjet printing machines, due to the tiny inkjet droplet size (on the order of several thousandths of an inch). The high resolution of commercially available inkjet printing machines may provide a disposable mold 20 with surface finishes close to those obtained by conventional machining. This alleviates the surface roughness issues sometimes associated with other rapid prototyping techniques. The resolution of the rapid prototyping machine 12, and its associated build-up time, will determine the cost of the system and the cycle time to produce the disposable mold 20.

The disposable mold 20 is a sacrificial component having a negative imprint of the desired part 30 to be fabricated. That is, the internal walls of the disposable mold 20 are defined by the external walls of the desired part 30. The disposable mold 20 is not an intermediary component that will later become the final part 30, nor is it incorporated into the final part 30. A final part 30 is characterized with surfaces defining the boundaries of a volume comprising the part material. The negative imprint of a part is therefore the inverse of the surfaces defining such volumes. The negative imprint may be scaled or offset to accommodate shrinkage or expansion due to the fabrication process.

The mixer 14 is configured to form a slurry 22 from a powder 24 and a liquid binder 26. In the illustrative embodiment, a commercial mixer is used. The mixing capacity and mixing speed can be varied according to need; for example, the volume of the 3D final part 30 affects the mixing batch size. The mixing speed is controlled to avoid viscous heating of the slurry, which may lead to premature curing. The curing process is an exponential function of temperature, following the Arrhenius law, so small differences in temperature are greatly magnified. A partially cured slurry will increase its viscosity, which may prevent flow during injection in the injection molding machine 16.

In an alternative embodiment, the mixer 14 is configured to mix in a vacuum environment. A vacuum environment is an environment in a pressure controlled chamber or vessel having sub-atmospheric pressure. Mixing in a vacuum environment is done to prevent the entrapment of air into the slurry 22 during the mixing step, as any trapped air during mixing can result in defects in the fabricated final part 30.

In the illustrative embodiment, the powder 24 and liquid binder 26 are mixed to form a slurry 22. The viscosity of the slurry 22 is a function of powder loading, which is the quantity of powder 24 added to the binder 26, in a conventional powder injection molding process.

In the illustrative embodiment, the powder 24 is composed, in whole or in part, of a metallic powder. The distribution of powder particle sizes and shapes is a function of the particular material, and can affect the viscosity of the slurry 22. The size and shape of the powder particles will also affect the strength of the final part 30 after sintering. In an alternative embodiment, the powder 24 is composed, in whole or in part, of a ceramic powder.

The binder 26 is a low viscosity liquid material that carries the powder 24 into the disposable mold 20, in the form of the slurry 22, as well as holds the powder 24 in a homogenously distributed state in the disposable mold 20. In the illustrative embodiment, the liquid binder 26 is composed, in whole or in part, of a liquid thermoset plastic. Alternative materials for the liquid binder 26 are epoxy, siloxane, or another such resin. A low viscosity material for the binder 26 is generally desirable for introducing the slurry into the disposable mold 20 without damaging the disposable mold 20. In an alternative embodiment, the binder 26 may be another liquid, such as water or a water-alcohol mixture.

The injection molding machine 16 is configured to introduce the slurry 22 into the disposable mold 20. The disposable mold 20 is filled with the slurry 22 to form the filled mold 28. The resulting output of the three dimensional part fabrication system 10 is a complex three dimensional part 30. In the illustrative embodiment, the injection molding machine 16 is a low-pressure injection machine specifically designed to inject the slurry 22 into the disposable mold 20 at a low pressure. Conventional injection molding systems may be utilized. In an alternative embodiment, the injection molding machine 16 is a caulking gun or a plunger. In another alternate embodiment, the injection molding machine 16 is placed in a low pressure or vacuum environment, to avoid trapped air that might prevent the disposable mold 20 from being completely filled.

The furnace system 18 comprises a plurality of furnaces, or a single furnace configured to operate over a broad range of temperatures. In the illustrative embodiment, the furnace system 18 is used to cure the binder 26, burn off the disposable mold 20, burn off the binder 26, and sinter the part 30. The furnace system 18 is generally a commercial furnace capable of programmable temperature control, ranging from just above room temperature to thousands of degrees Fahrenheit.

In alternate embodiments, the filled mold 28 is placed in an oven for curing the binder 26 at low temperatures. In this alternative embodiment, the furnace system 18 is comprised of two heating devices, a low temperature oven (for curing the liquid binder 26) and a high temperature furnace (for burning off the disposable mold 20, burning off the liquid binder 26, and sintering the part 30).

In various alternative embodiments, the part/mold design system 32 is utilized to provide a three dimensional mold description 34 to the rapid prototyping machine 12. The part/mold design system 32 is a commercial computer-aided design (CAD) software program, including, but not limited to, any of several different programs such as UniGraphics (UG) and AutoCAD, although other such programs can be used. The part/mold design system 32 is used to provide a first digital file describing the part geometry. The part/mold design system 32 is then used to generate a second digital file 34 describing the disposable mold geometry which surrounds the part geometry. In an alternative embodiment, the part/mold design system 32 is a non-commercial software program capable of producing a digital file in the same format as the commercial programs. The three dimensional mold description 34 is a digital file describing the disposable mold 20. This file is exported from the CAD program as a stereolithography (.STL) file, which is the rapid prototyping industry standard for file sharing and part/pattern production. Other file formats may be used if required by the particular RP system.

The three dimensional part fabrication system 10 may be further comprised of a controller 36. The controller 36 controls the fabrication process. Various sub-controllers may interface with controller 36, the sub-controllers controlling, in whole or in part, the rapid prototyping machine 12, the mixer 14, the injection molding machine 16, and the furnace system 18. The controller 36 may be coupled directly to sensors to determine, for example, pressure, flow rate, liquid levels, and temperatures throughout the process. Sensor input may be parameters communicated from sub-controllers having onboard sensors to the controller 36. The controller 36 may also be coupled to the part/mold design system 32.

Figure 2:
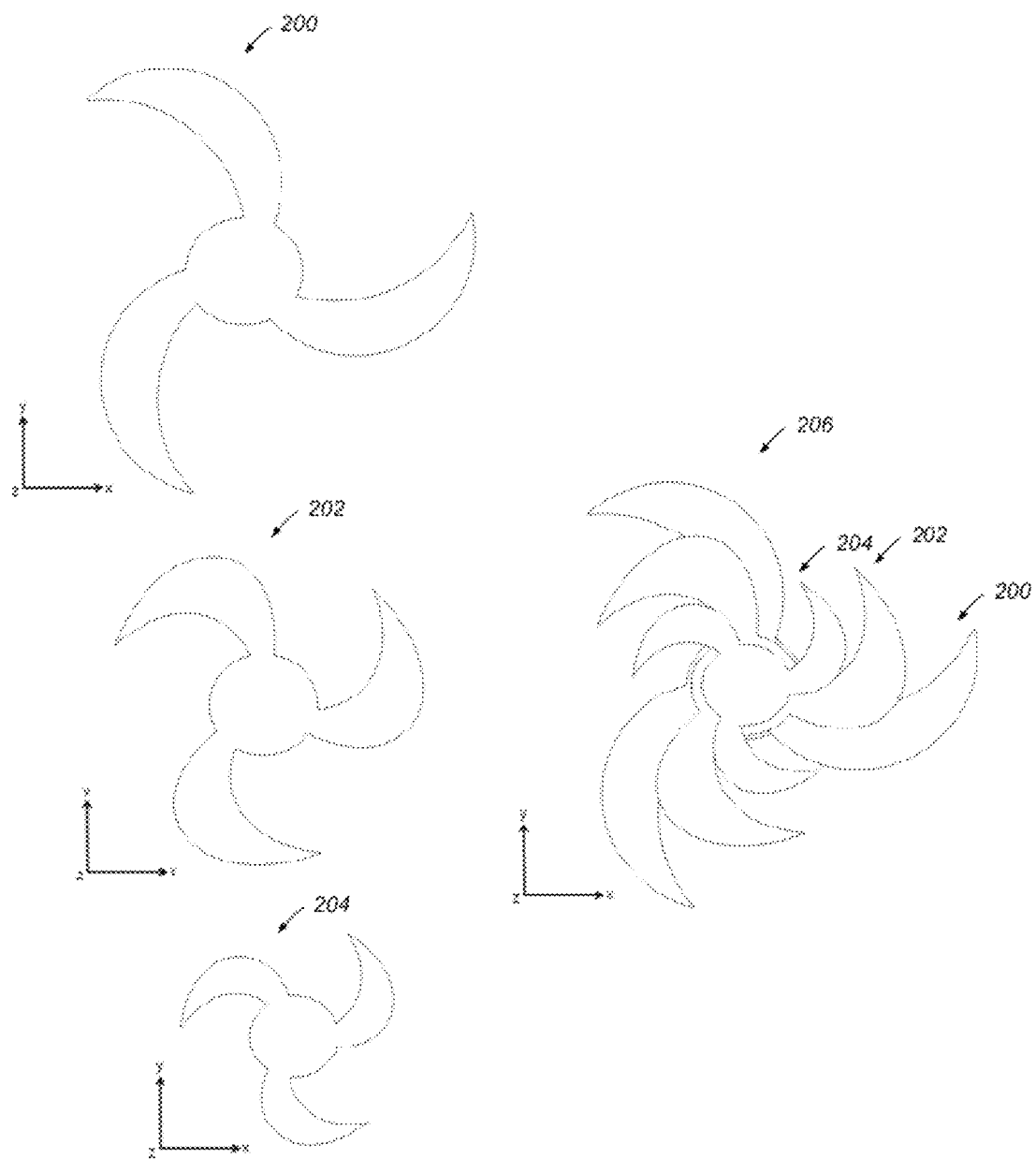
FIG. 2 is a diagram illustrating an exemplary three dimensional part fabricated by the three dimensional part fabrication system of FIG. 1 in accordance to the illustrative embodiment.

FIG. 2 is a diagram illustrating an exemplary three dimensional part fabricated by the three dimensional part fabrication system of FIG. 1 in accordance with the illustrative embodiment. In FIG. 2, an exemplary three dimensional part is illustratively shown as three cross-sections: part section 200, 202, 204, at three different locations along the z-axis, showing a change in size and shape. Part sections 200, 202, 204 are overlaid onto each other as a top-view of part section 206 to describe the final part 30. From FIG. 2, it can be determined that it is not possible to define a parting line for opening a conventional two-piece mold for manufacturing this exemplary complex three dimensional part. Even with additional mechanical mechanisms, such as side-actions or cam-actuated slides, this part could not be manufactured.

Figure 3:
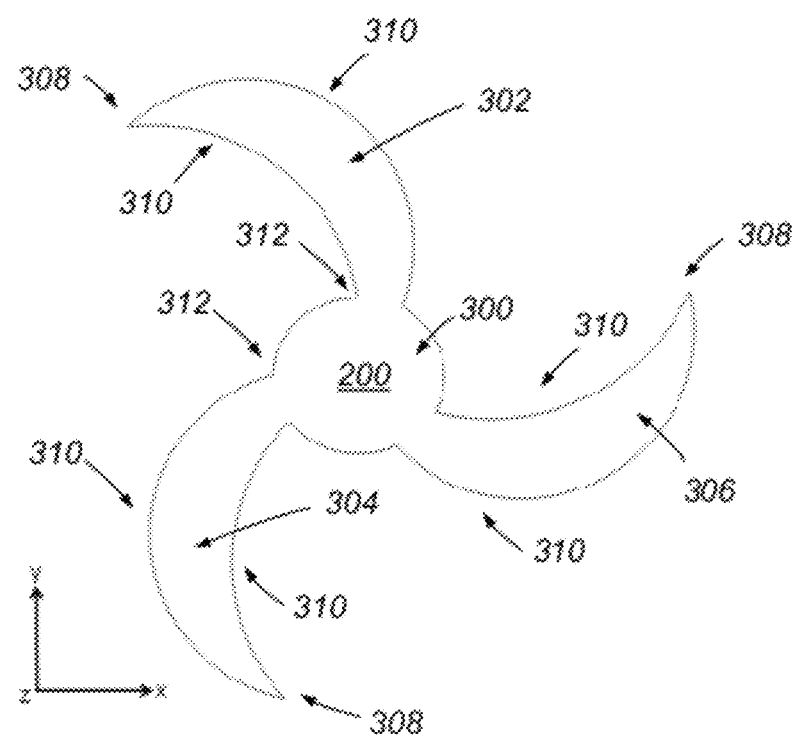
FIG. 3 is a detailed diagram of a section of the exemplary three dimensional part of FIG. 2 in accordance to the illustrative embodiment.

FIG. 3 is a detailed diagram of a section of the exemplary three dimensional part of FIG. 2 in accordance with the illustrative embodiment. In FIG. 3, part section 200 is described to illustrate the various complex geometries enabled by this disclosure. Part section 200 comprises a core section 300 with three fins (302, 304 and 306) protruding. The fins 302, 304, and 306 are illustratively shown comprising sharp tips 308, complex curves 310, and complex angles 312.

Figure 4:
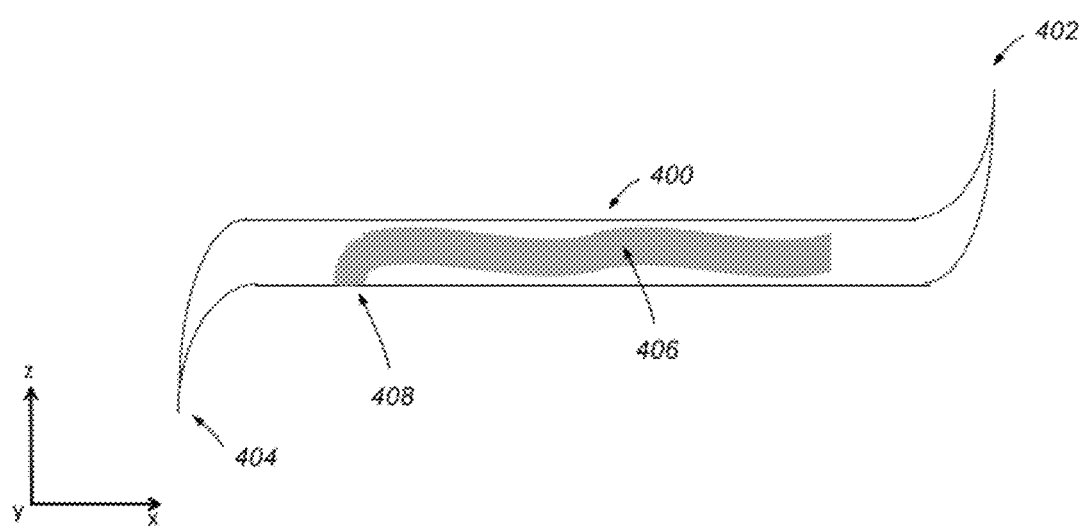
FIG. 4 is a side view of the exemplary three dimensional part of FIG. 2 in accordance to the illustrative embodiment.

FIG. 4 is a side view of the exemplary three dimensional part of FIG. 2 in accordance to the illustrative embodiment. FIG. 4 illustrates a section of the complex three dimensional part 400 having a complex geometric structure in the z-axis, the tip of each cross-section twists up 402 and down 404, and internal cooling pathways 406. The part 400 is illustrated having an opening 408 of the internal cooling pathway 406. An additional opening could be envisioned to provide an exit for the internal cooling pathway 406. Similarly, one skilled in the art will recognize that additional openings and/or exits (not shown) may exist in other cross-sectional planes not depicted in FIG. 4. This representation is intended solely to demonstrate the 3D concept for this methodology; it is not intended to represent any real part or constitute any limitation of the scope of the various embodiments of the invention. The internal cooling pathway 406 is formed by generating long channels or protrusions internal to the disposable mold 20. Such long channels or protrusions are terminated proximal to or through the surface of the final part 30.

Figure 5:
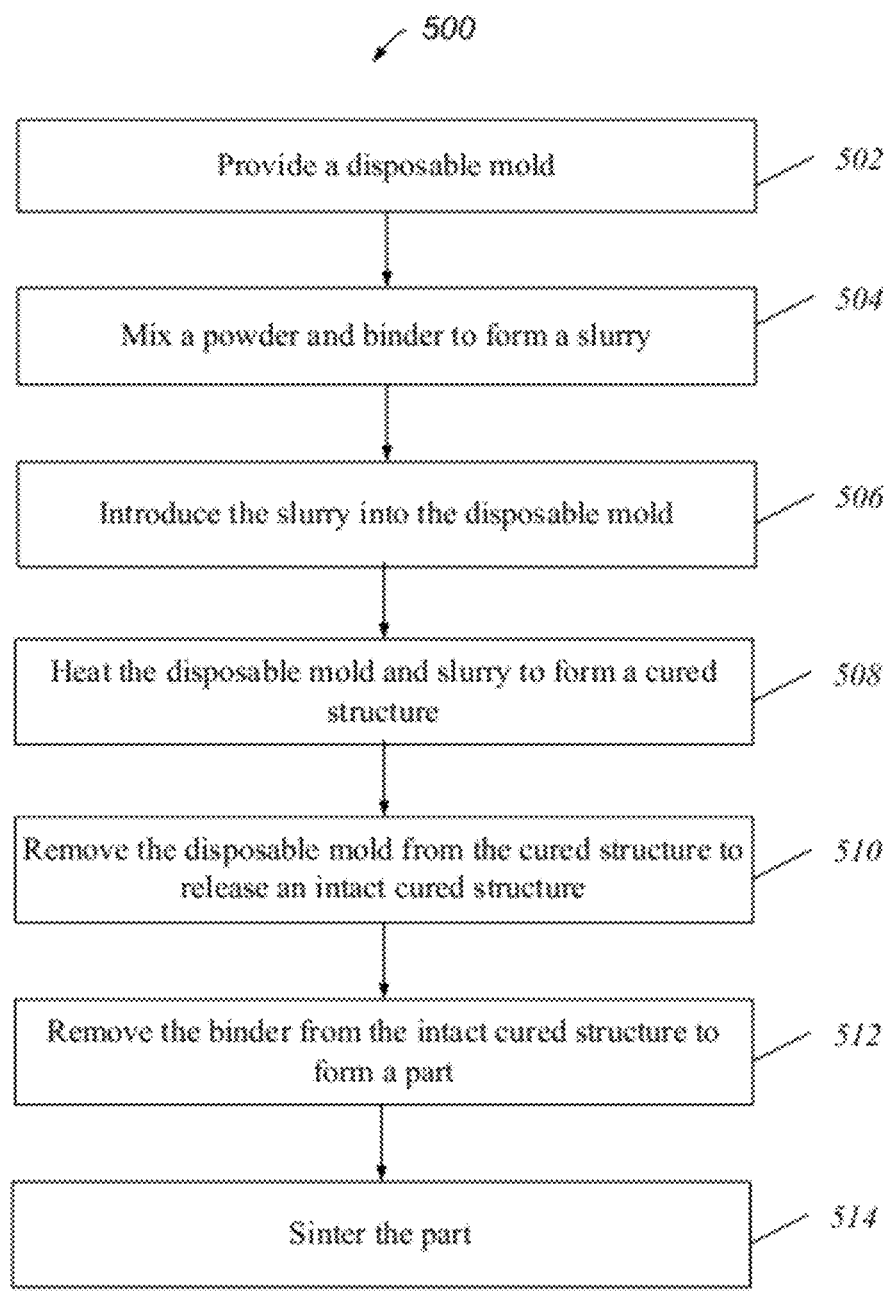
FIG. 5 is a flowchart illustrating the procedure of a molding method in accordance to the illustrative embodiment.

FIG. 5 is a flowchart illustrating the procedure of a molding method 500 in accordance to the illustrative embodiment, using a fabricated disposable mold and conventional powder injection molding, comprised of the following steps:

Provide the disposable mold 20 (block 502);
Mix the powder 24 and the liquid binder 26 to form the slurry 22 (block 504);
Introduce the slurry 22 into the disposable mold 20 (block 506);
Heat the disposable mold 20 and slurry 22 to form a cured structure (block 508);
Remove the disposable mold 20 from the cured structure, leaving the cured structure intact (block 510);
Remove the binder 26 from the cured structure to form the part 30 (block 512); and
Sinter the part 30 (block 514).

Figure 6:
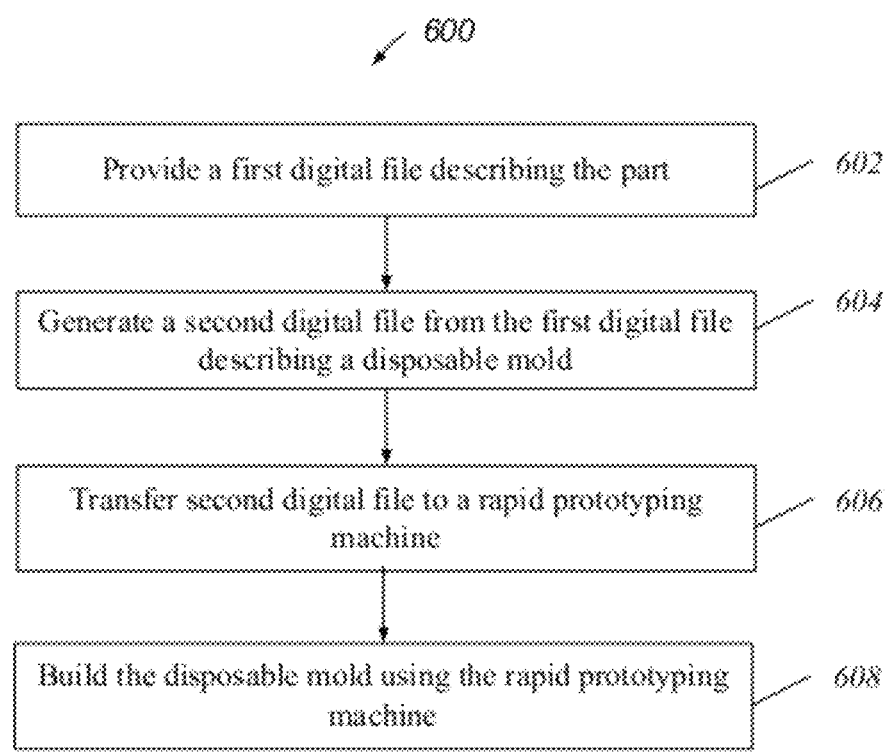
FIG. 6 is a flowchart illustrating the procedure to fabricate a disposable mold in accordance to the illustrative embodiment.

In step 502, a disposable mold 20 is provided. The disposable mold 20 can be provided by various means, including being fabricated by a rapid prototyping machine. The disposable mold 20 may be fabricated by some other external process and then subsequently provided. In an alternative embodiment, additional surface and geometric polishing may be performed to treat the internal surface of the disposable mold 20 to generate a desired texture, shape, or finish. In the illustrative embodiment, the process to provide a disposable mold 20 is shown in FIG. 6. FIG. 6 is a flowchart illustrating a procedure 600 to fabricate a disposable mold in accordance to the illustrative embodiment, comprised of the following steps:

Provide a first digital file describing the part (block 602);
Generate a second digital file from the first digital file describing a disposable mold (block 604);
Transfer the second digital file to a rapid prototyping machine 12 (block 606); and
Build the disposable mold 20 using the rapid prototyping machine 12 (block 608).

In step 602, a first digital file describing the 3D part is provided using a commercial computer-aided design (CAD) software program, including, but not limited to, any of several different programs such as UniGraphics (UG) and AutoCAD, although other such programs can be used. Custom software programs or program libraries may also be developed, tailored to produce specific complex geometries. Once the geometry has been fully defined, a digital file describing the geometry of this 3D part is created in step 602.

In step 604, a second digital file is generated, the second digital file describing a disposable mold 20 surrounding the specified 3D part. The second digital file is a negative imprint of the 3D part, where the internal walls of the disposable mold 20 are defined by the external walls of the desired part 30. The second digital file describing the disposable mold can be generated using a commercial computer-aided design (CAD) software program, including, but not limited to, any of several different programs such as UniGraphics (UG) and AutoCAD, although other such programs can be used. In the illustrative embodiment, the disposable mold geometry is generated as a negative imprint of the first digital file, using, for example, the "offset" function in the CAD package to define the disposable mold wall thickness. The negative imprint digital file may also be generated, in whole or in part, by manual commands from the designer.

Figure 7:
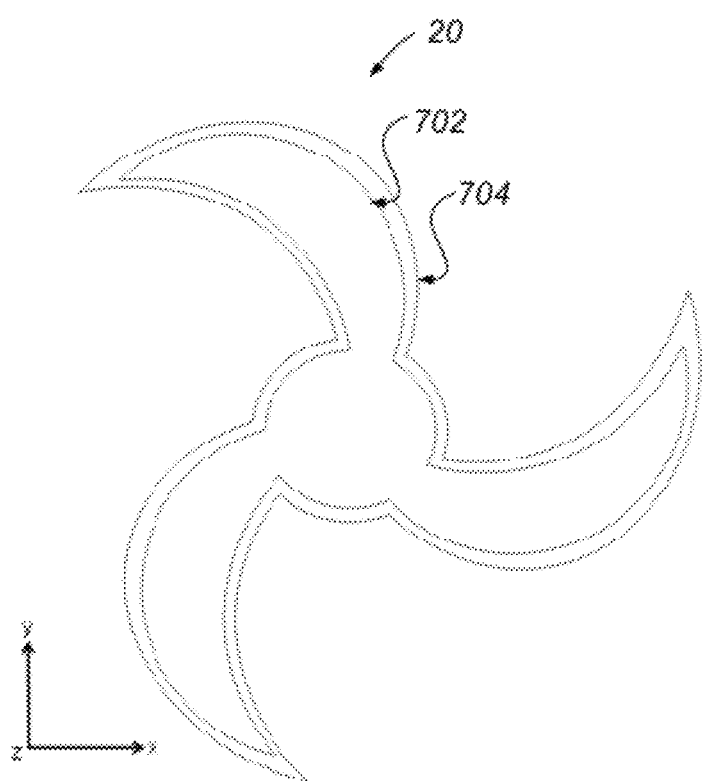
FIG. 7 is a diagram of a single cross-section of a disposable mold provided in accordance to the illustrative embodiment.

Design considerations in steps 602 and 604 are illustrated in FIG. 7, which is a diagram of a single cross-section of the disposable mold 20 provided in accordance with the illustrative embodiment. The disposable mold 20 surrounds the 3D part geometry and has internal walls 702 and external walls 704. The proper wall thickness for the disposable mold 20 is determined, the thickness being sufficient to withstand the pressure during the powder/slurry introduction step 506 without cracking the mold 20. However, the thickness cannot be so thick as to generate excessive stresses during the disposable mold removal step 510, which could lead to cracking of the final part 30. In the illustrative embodiment, the disposable mold wall thickness is of constant thickness. In various alternate embodiments, the wall thickness is of variable thickness. The wall thickness of the disposable mold can range from a few mils to an inch or more. The disposable mold wall thickness can be specifically designed through computer modeling.

In step 606, the second digital file, describing the disposable mold geometry, is transferred to the selected rapid prototyping machine 12. In the illustrative embodiment, the second digital file is exported from the CAD program as a stereolithography (.STL) file, which is the RP industry standard for file sharing and part/pattern production. In an alternative embodiment, other file formats may be used if required or permitted by the particular RP machine.

In step 608, the 3D polymeric disposable mold 20 is build using the rapid prototyping machine 12. In the illustrative embodiment, this step consists of building the disposable mold geometry layer by layer by the inkjet printing process. The inkjet printing process may be done in different ways depending on the specific rapid prototyping system, such as single point printing, line printing or 2D page printing. In the illustrative embodiment, the disposable mold is made from ultraviolet-curable acrylic.

In the illustrative embodiment, the inkjet printing process employs two heads; one for the build material (in this case, the disposable mold) and the other for the support material. The support material is necessary for any geometry with over-hang features, which occur when subsequent layers are larger than previous layers in the build direction. In the illustrative embodiment, this support material can be made of wax. In alternative embodiments, the support material can be made of water-soluble or chemically-soluble material. The support material is removed after the disposable mold has been completely built. It may be removed thermally or chemically, depending on the specific support material.

In alternative embodiments, step 608 may use techniques such as selective laser sintering, fused deposition, stereolithography (SLA), other layer manufacturing techniques, or other RP methods. In these embodiments, polymeric or even low melting-point metals can be used for building the disposable mold. In the embodiment using a metal disposable mold, the disposable mold melting point must be higher than the binder curing temperature 508 and lower than the debinding temperature of the cured powder/binder structure 512.

Once the disposable mold has been provided, the disclosed molding method 500 for molding complex 3D parts can be followed.

In step 504, the powder 24 and the liquid binder 26 are mixed to form a slurry 22. In the illustrative embodiment, metallic powder is mixed with a liquid thermoset plastic. The powder 24 and liquid binder 26 may be mixed in a vacuum environment to prevent trapped air in the slurry during the mixing process 504.

In step 506, the powder/binder slurry 22 is introduced into the disposable mold 20. A low viscosity material for the binder 26 is desirable for introducing the slurry 22 into the disposable mold 20 without damaging the disposable mold 20. In the illustrative embodiment, a low-pressure injection process is utilized using an injection machine specifically designed to inject the slurry 22 into the disposable mold 20 at a low pressure. In alternative embodiments, the powder/binder slurry 22 is introduced by being poured, using the gravitational force or centrifugal forces generated by spinning the disposable mold 20.

In step 506, it is necessary to insure that there is no trapped air during molding. In conventional molding of 2½D parts, the parting line between the two halves of the mold serves as a natural vent for the escape of trapped air, which is often accompanied by flash, or extra material that squeezes out through the gap between the mold halves at the end of filling. Another way to avoid trapped air in conventional molding of 2½D parts is to design small vent holes into the mold. However, the lack of a parting line for fully enclosed 3D molds means there is no natural vent for trapped air to escape. In an alternative embodiment, the disposable mold 20 is designed and fabricated with small vent holes, which are designed into the disposable mold geometry before fabrication. In a further alternative embodiment, vacuum-assisted injection molding may be employed. In another alternative embodiment, the disposable mold is fabricated using a mold wall section consisting of a porous material, in which the pore structure of the mold material allows air, but not the powder/binder slurry, to leak out during the slurry introduction.

In an alternative embodiment, a programmable flow rate control system is utilized to maintain a low injection pressure in step 506. The pressure may be lowered near the end of step 506 to prevent damage to the disposable mold 20. Low viscosity, epoxy-type binders may also be employed to assist in maintaining low injection pressure. In alternate embodiments, the programmable flow rate control system may be integrated into or is part of controller 36.

Figure 8:
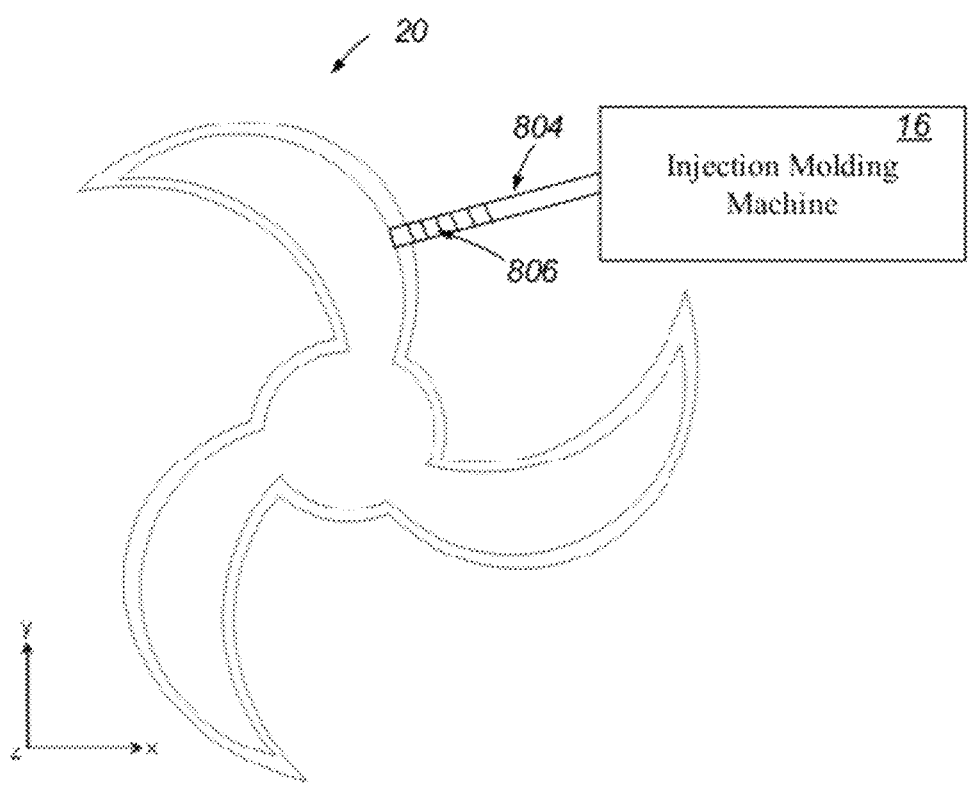
FIG. 8 is a diagram showing an alternative introduction of the slurry into the disposable mold in accordance to the illustrative embodiment.

In alternative embodiments of step 506, introducing the slurry into the disposable mold includes passing the slurry through a static mixer before the slurry enters into the disposable mold. The static mixer is employed before the gate into the disposable mold 20 to break the yield condition of the potentially visco-elastic powder/binder slurry 22, in order to avoid damaging the disposable mold during this introduction, as shown in FIG. 8, which is a diagram showing an alternative introduction of the slurry 22 into the disposable mold 20 in accordance to the illustrative embodiment. In FIG. 8, an unfilled mold 20 is shown coupled to a delivery system 804, the delivery system 804 having a static mixer 806 coupled within. The slurry 22 in the delivery system 804 can settle, leading to an initial high resistance to flow. The static mixer 806 is utilized to break this bonding in the slurry before it enters the disposable mold.

Figure 9:
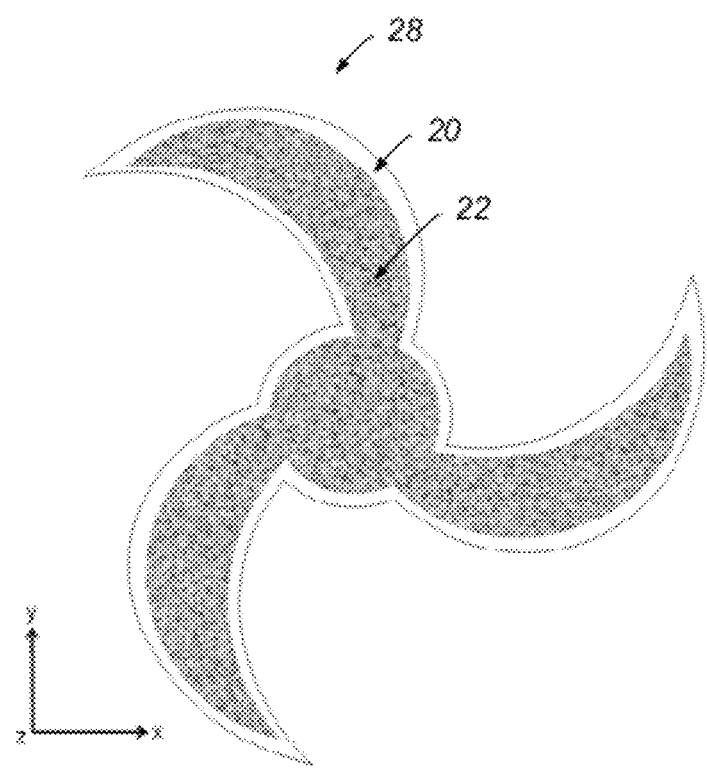
FIG. 9 is a diagram of a single cross-section of a disposable mold filled with the slurry in accordance to the illustrative embodiment.

In step 508, the disposable mold 20 and the powder/binder slurry 22 contained therein are heated to form a cured structure. The result of step 508 is shown in FIG. 9, which is a diagram of a single cross-section of the fabricated disposable mold 20, where the disposable mold has been filled with a powder/binder slurry 22, forming a filled mold 28. The curing process is performed at a relatively low temperature as dictated by the specific binder used, typically less than 100 degree C., which is also lower than the temperature to remove or burn-off the disposable mold. In the alternative embodiment, if the binder 26 is water, then the curing step 508 is not necessary.

Figure 10:
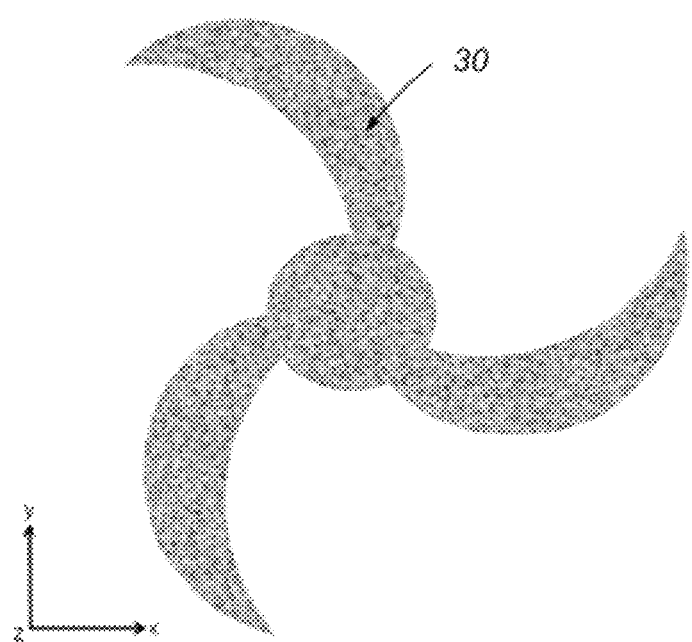
FIG. 10 is a diagram of a single cross-section of the exemplary three dimensional part.

In step 510, the disposable mold 20 is removed from the cured structure, leaving the cured structure intact. The result of step 510 is shown in FIG. 10, which shows a single cross-section of an exemplary 3D part 30, after the disposable mold has been removed by thermal, chemical or mechanical mean, or a combination thereof. In the illustrative embodiment, thermal removal of the mold is employed using time-temperature cycling optimized to prevent damage to the cured powder/binder 3D structure due to thermal stresses. The disposable mold burnoff temperature is higher than the binder curing temperature in step 508, and lower than the temperature to remove the binder during debinding in step 512. The disposable mold 20 and cured structure may be placed in a ceramic powder bed prior to heating in order to prevent distortion or damage due to gravity during thermal removal of the disposable mold. The ceramic powder bed can be composed of any high temperature ceramic powder, such as sand, quartz sand, alumina powder, or any other such material.

In alternative embodiments of step 510, chemical removal is utilized. Proper solvent and the soak time are critical to prevent damage to the cured powder/binder 3D structure. In an alternative embodiment where the RP resin is water-soluble, then the disposable mold can be removed by simply soaking it in water.

In step 512, the binder 26 is removed from the powder/binder system, in a debinding process. In the illustrative embodiment, the debinding process is a thermal process where the powder/binder cured structure is placed in a furnace to vaporize the binder through sublimation. The time-temperature cycle is controlled to balance the rate of volatile gas generation and the rate of gas permeation out of the structure, in order to prevent localized explosions that may crack the component as gases are generated faster than they can escape through the porous part. In an alternative embodiment, step 512 may be accomplished by placing the object in a ceramic powder bed, such as sand, quartz sand, alumina powder or a similar material, in order to prevent any distortion of the object due to gravity or other forces. In another alternative embodiment, the debinding step utilizes a chemical solvent to dissolve the binder. In the alternative embodiment where the binder used is water, then step 512 is omitted.

In step 514, the 3D structure is sintered to form the final part 30. During sintering, the pore volume occupied by the binder is removed. The step 514 may be accomplished by placing the object in a ceramic powder bed, such as sand, quartz sand, alumina powder or a similar material, in order to prevent any distortion of the object due to gravity or other forces.

In the illustrative embodiment, steps 510, 512 and 514 are illustrated as separate and distinct processes. However, it should be apparent to one skilled in the art that certain process steps may be combined. For example, without limiting the scope of the various embodiments of the invention, steps 510 and 512 can be completed as one continuous firing cycle. In another example, steps 512 and 514 can be completed as one continuous firing cycle. In yet another example, steps 510, 512 and 514 can be completed as one continuous firing cycle.

Thermoplastic parts may be fabricated using the method and system disclosed herein. The thermoplastic material should be capable of being injected at a very low pressure. However, most thermoplastics have a high viscosity and require a high injection pressure, which could damage the disposable mold. Also, thermoplastic materials suitable for use in practicing embodiments of the invention should be able to withstand the disposable mold burn-off temperature. However, most thermoplastics have low softening temperatures and would deform during burn-off, although a chemical removal process may be employed in an alternative embodiment.

It is contemplated that airframe parts and engine components for aerospace and gas turbine systems may be fabricated by the system and method disclosed herein. For some sophisticated high-value-added 3D parts, such as aerospace, airframe and aircraft engine components, the design is strictly dictated by performance improvement. Aerodynamics and heat transfer are primary concerns. The system and method disclosed will to help achieve the goal of design for performance. Greater design freedom and lower cost to implement internal cooling passageways for heat transfer as well as the external aerodynamics for minimizing flow resistance in the aerospace, airframe, and aircraft engine industries, would enable better product performance.

Figure 11:
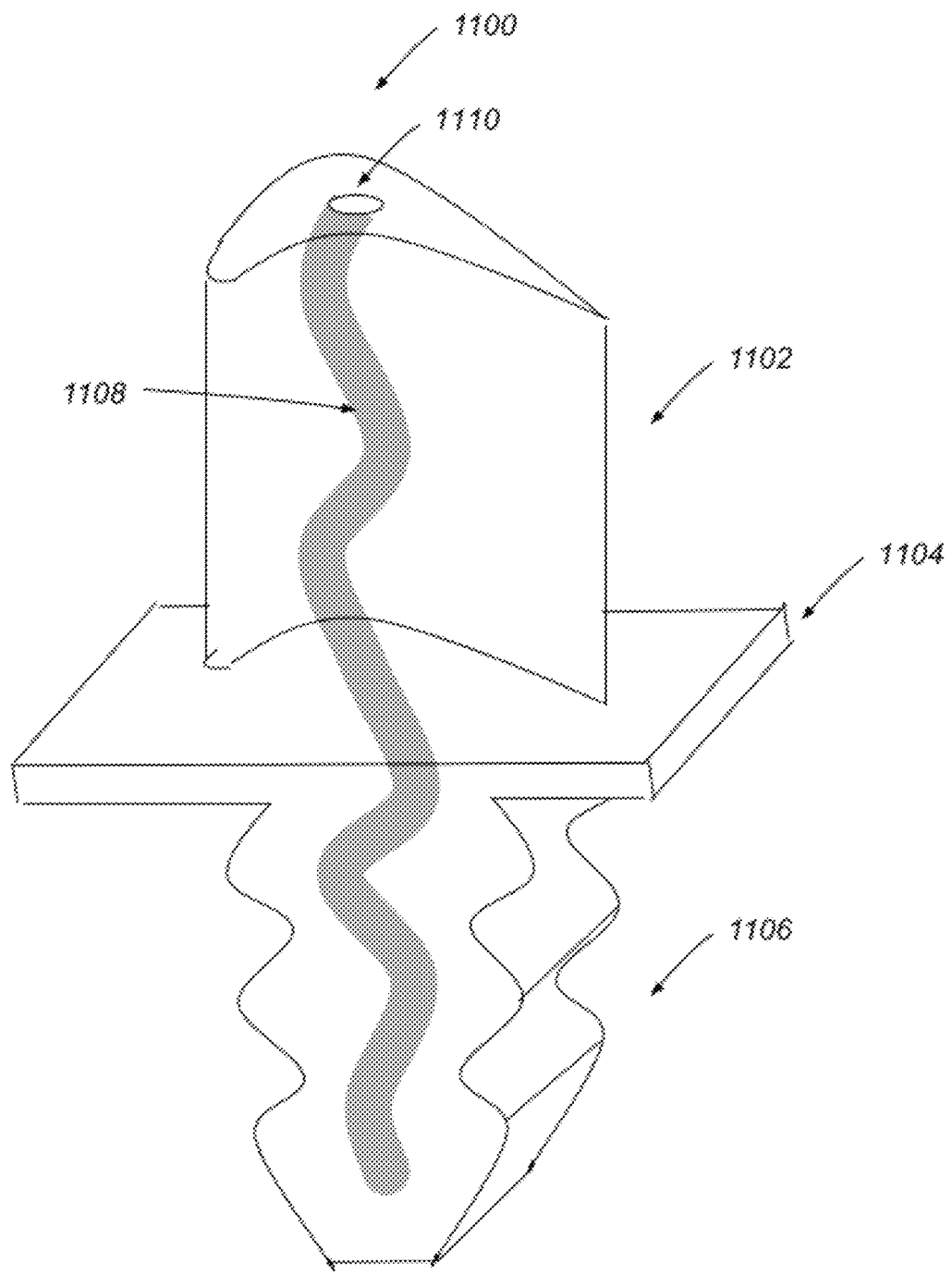
FIG. 11 is a diagram of an airfoil with a complex internal pathway fabricated with the three dimensional part fabrication system and method thereof in accordance to the illustrative embodiment.

As an illustration, FIG. 11 shows a diagram of an airfoil with a complex internal pathway fabricated with the three dimensional part fabrication system and method in accordance to the illustrative embodiment. In FIG. 11, an airfoil 1100 is illustrated having a blade 1102, a platform 1104, a dove tail 1106, and various internal cooling pathways 1108. The blade 1102 is illustrated having opening 1110 of the internal cooling pathway 1108. The internal cooling pathway is illustrated with complex curves and geometries that would be impractical or even impossible to fabricate using conventional systems and methods.

It is further contemplated that the system and method herein can be utilized in medical devices, such as medical prosthesis. The capabilities to fabricate and design complex 3D parts would enable new joint and bone designs that are tailored to individuals and have customized physical dimensions. Conventional digital imaging and tomographic scanning technologies may be utilized to model exact replicas of joints and bone structure for a particular patient to fabricate "perfect fit" replacement parts. Dental implants and jaw bone replacements would also benefit from the system and method disclosed herein.

Other industrial applications, such as automotive, consumer, electronics, and marine/submarine, would benefit from the creative design of 3D objects, or objects with 3D hollow cavities, that will result from the methods and systems provided by the various embodiments of the invention. For example, lighting systems generate substantial amounts of heat and require cooling. This technology could be used to design 3D cooling channels to release such heat.

In the foregoing Detailed Description, various features are grouped together in a single embodiment for the purpose of streamlining the disclosure. This method of disclosure is not to be interpreted as reflecting an intention that the various claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

It will be readily understood to those skilled in the art that various other changes in the details, material, and arrangements of the parts and method stages which have been described and illustrated in order to explain the nature of this invention may be made without departing from the principles and scope of the invention as expressed in the subjoined claims.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

What is claimed is:

1. A molding, method comprising:
   injecting, a metal powder-liquid binder slurry into a disposable mold formed from at least one of an ultraviolet curable acrylic or a photosensitive material and having internal walls that form a negative imprint of a complex three-dimensional geometry of a complex three-dimensional metal part, wherein the volume of the metal powder-liquid binder slurry is substantially equivalent to the volume of the complex three-dimensional geometry;
   heating the disposable mold and the metal powder-liquid binder slurry therein to form a cured, complex three-dimensional structure from the metal powder-liquid binder slurry, the liquid binder in the metal powder-liquid binder slurry being cured by the heating;
   removing the disposable mold from the cured, complex three-dimensional structure to release the cured, complex three-dimensional structure, wherein removing the disposable mold from the cured structure comprises
      placing the disposable mold and the cured, complex three-dimensional structure in a ceramic powder bed; and
      heating the disposable mold and the cured, complex three-dimensional structure to a temperature sufficient to substantially burn off the disposable mold and lower than a temperature sufficient to substantially remove the binder,
   removing the binder from the cured, complex three-dimensional structure to form the complex three-dimensional metal part; and
   sintering the complex three-dimensional metal part.

2. The molding method of claim 1, further comprising:
   forming the disposable mold using an inkjet printing device.

3. The method of claim 2, wherein using the inkjet printing device comprises at least one of single point printing, line printing, or two-dimensional page printing.

4. The molding method of claim 1 wherein the liquid binder includes a thermoset plastic.

5. The molding method of claim 1, further comprising:
   mixing the metal powder and the liquid binder in a vacuum.

6. The molding method of claim 1 wherein injecting the metal powder-liquid binder slurry into the disposable mold includes passing the metal powder-liquid binder slurry through a static mixer before the metal powder-liquid binder slurry enters into the disposable mold.

7. The molding method of claim 1 wherein injecting the metal powder-liquid binder slurry into the disposable mold is performed at vacuum.

8. The molding method of claim 1, further comprising:
allowing air to freely move out of the disposable mold during the injecting through at least one of at least one vent hole or a mold wall section having a porous material.

9. The molding method of claim 1 wherein removing the binder from the cured, complex three-dimensional structure to form the complex three-dimensional metal pan includes heating the cured, complex three-dimensional structure to vaporize the binder through sublimation with a controlled time-temperature cycle.

10. The molding method of claim 1, wherein the ceramic powder bed comprises at least one of sand, quartz sand, or alumina powder.

11. The molding method of claim 1, wherein removing the binder comprises chemically dissolving the binder.

12. The molding method of claim 1, the negative imprint of the disposable mold is scaled relative to the complex three-dimensional geometry of the complex three-dimensional metal part.

13. A method of making a complex three-dimensional part, comprising:
introducing a metal powder-liquid binder slurry into a disposable mold formed from at least one of an ultraviolet curable acrylic or a photosensitive material and having internal walls that form a negative imprint of a complex three-dimensional geometry of the complex three-dimensional metal part, wherein the negative imprint is scaled to accommodate shrinkage or expansion and a volume of the metal powder-liquid binder slurry is substantially equivalent to the volume of the complex three-dimensional geometry;

heating the disposable mold and the metal powder-liquid binder slurry therein to form a cured, complex three-dimensional structure from the metal powder-liquid binder slurry, the liquid binder in the powder-liquid binder slurry being cured by the heating;

removing the disposable mold from the cured, complex three-dimensional structure to release the cured, complex three-dimensional structure, wherein removing the disposable mold is performed in a bed of ceramic powder;

removing the binder from the cured, complex three-dimensional structure to form the complex three-dimensional metal part; and sintering the complex three-dimensional metal part.

14. The method of claim 13, wherein introducing the metal powder-liquid binder slurry into the disposable mold comprises using centrifugal forces generated by spinning, the disposable mold.

15. The method of claim 13, further comprising:
forming the disposable mold by at least one of selective laser sintering, fused deposition, or stereolithography.

16. The method of claim 13, wherein removing the disposable mold, removing the binder, and sintering is performed in one continuous firing cycle.

* * * * *